Figure 1:
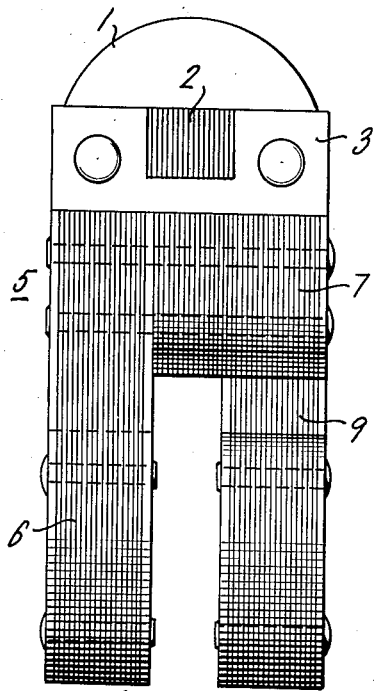

Nov. 24, 1936.   L. P. KONGSTED   2,061,839

STATOR STRUCTURE FOR DYNAMO-ELECTRIC MACHINES

Filed Jan. 22, 1936

INVENTOR.
LUDVIG P. KONGSTED

BY

ATTORNEY.

Patented Nov. 24, 1936

2,061,839

UNITED STATES PATENT OFFICE 2,061,839

STATOR STRUCTURE FOR DYNAMO ELECTRIC MACHINES

Ludvig P. Kongsted, Longmeadow, Mass., assignor to United American Bosch Corporation, Springfield, Mass., a corporation of New York Application January 22, 1936, Serial No. 60,166

5 Claims. (Cl. 171—209)

This invention relates to dynamo electric machines and more particularly to the stator structure which comprises a portion of the magnetic circuit in a magneto. Such structures in the past have required fine machine work and relatively complicated assembly processes. A great difficulty in the prior art has been to provide a low reluctance magnetic path between two laminated structures of widely different cross sectional area and shape. These conditions usually exist in dynamo electric machines such as magnetos where the magnetic flux must be transferred from a wide stack of laminations in the pole shoes to a relatively narrow group of laminations passing through the primary and secondary coils. To rest the narrow coil core directly on the wider laminated structure in the pole shoes is obviously inefficient since only that section of the pole shoe laminations limited by the width of the coil core is efficiently utilized. The result is that magnetic flux from the adjacent group of pole shoe laminations must deliver flux to the active section laterally from one lamination to the next with resulting eddy current losses. In the patent to W. E. Schwarzmann No. 1,890,305, of which this is an improvement, there is illustrated a stator structure in which a narrowed upper structure transfers the flux quite efficiently from the lower wide section. However, this construction is quite expensive and difficult to manufacture as it is obtained by interleaving short laminations and then pinching together the ends of the longer laminations. In either of these methods used in the past it has been necessary to provide a finely ground seat for the core laminations in order to prevent a high reluctance due to the presence of a small air gap.

The primary object of this invention is, therefore, to provide a magnetic path of lower reluctance in dynamo electric machines.

Another object is to reduce eddy current losses in the magnetic circuits of such machines.

A further object is to provide a stator structure requiring fewer parts and simpler in assembly.

Still a further object is to provide a stator structure which is more efficient in operation and economical to manufacture.

Figure 2:
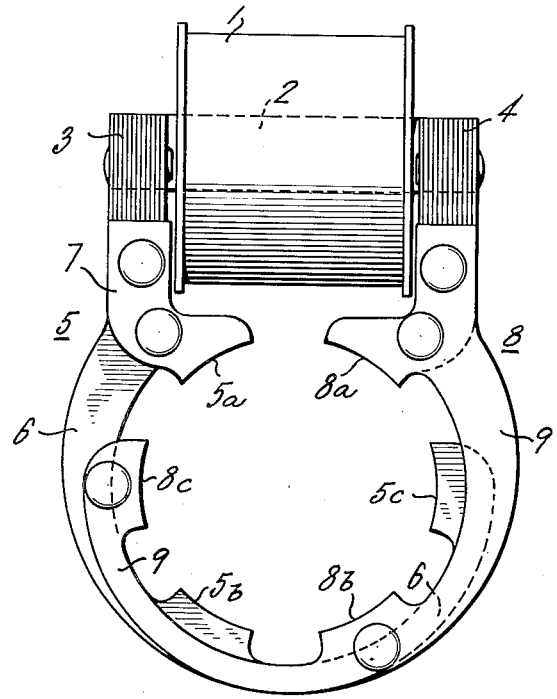
Figure 3:
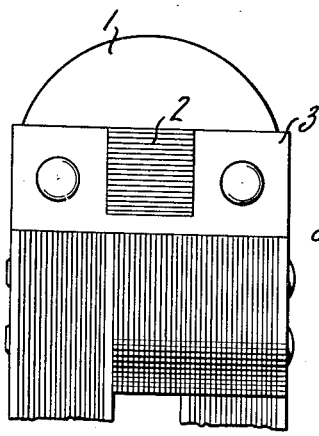
Figure 4:
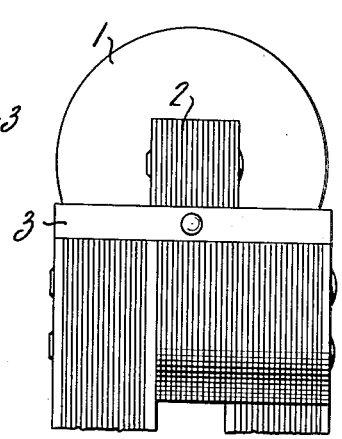
Figure 5:
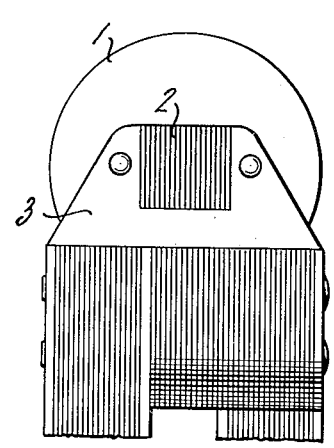

Other objects and advantages will in part be specifically set forth and in part be obvious when the following specification is read in connection with the drawing, in which:

Fig. 1 is a side elevation of one form of the improved stator structure; Fig. 2 is an end view taken from the right end of Fig. 1; Figs. 3, 4, and 5 are side elevations in fragmentary form, showing various modifications of Fig. 1.

Referring in more detail to Fig. 1, the numeral 1 represents a coil having a core 2 with vertically positioned laminations. The ends of the coil core are received in notched sockets which are cut in the laminated intermediate members 3 and 4. Any suitable means such as rivets may be employed to secure the laminations. The intermediate member 3 is supported on the top surface of a pole shoe 5 which may be of any desired type. In the form illustrated in Figs. 1 and 2, the pole shoe is composed of a group of long laminations 6 which extend in an arc of substantially 240° and a group of short laminations 7. The pole face 5a is formed in both sets of laminations and extends across the entire width of the pole piece 5. The pole faces 5b and 5c are formed on the long laminations 6 and are therefore of lesser width. The opposing pole piece 8, as shown in Fig. 2, is similarly constructed, having long laminations 9 and pole faces 8a, 8b, and 8c. In order to simplify the illustration an associated rotor is not shown.

In the alternative arrangement shown in Fig. 3, the laminations of the coil core 2 are horizontally positioned. The various design requirements of differing types of magnetos determine the vertical or horizontal positioning of the coil core laminations.

Fig. 4 shows a modification in which the intermediate member 3 is composed of narrow laminations of uniform height with the coil core 2 supported on the upper surface thereof.

Fig. 5 shows another modification of efficient magnetic design. The laminations of the intermediate member 3 are trapezoidal in shape to eliminate the unnecessary weight and bulk of low flux density areas. The upper surface of the member 3 is notched to provide a socket for the coil core 2, and the tie rivets are placed in the ears thus formed in a region of low flux density. In this manner losses and eddy currents in the rivets will be minimized.

It will be observed in all the foregoing arrangements that the laminations of the member 3 are positioned perpendicularly to the laminations of the pole pieces and the coil core. In this manner every lamination of member 3 has the optimum area of contact surface with the laminations of the pole pieces, and similarly with the coil core. Due to the large contact areas the magnetic reluctance of the structure is sufficiently low to remove the need for polished contact surfaces as in the prior art, thus providing an efficient and less expensive construction.

It will be obvious that many modifications and changes may be made by anyone skilled in the art without departing from the spirit and scope of the invention defined in the following claims.

I claim:

1. In a dynamo electric machine, a stator assembly comprising a laminated pole piece, an intermediate member of substantially trapezoidal form in conductive contact with said pole piece, a socket formed in an upper surface of said intermediate member, and a coil core supported by said socket in conductive relation to said member.

2. In a dynamo electric machine, a stator assembly comprising a laminated pole piece, an intermediate member conductively associated with said pole piece and having a socket formed therein, and a coil core closely received in said socket, said socket having a depth of at least one-half the vertical extent of the received portion of said coil core.

3. In a dynamo electric machine, a stator assembly comprising a laminated pole piece, an intermediate member positioned on the upper surface of said pole piece and having a socket formed therein, and a coil core closely received in said socket, said socket having a depth of at least one-half the vertical extent of the received portion of said coil core.

4. In a dynamo electric machine, a stator assembly comprising a laminated pole piece, an intermediate member positioned on said pole piece perpendicular to the plane of said laminations and having a socket formed therein, and a coil core having a portion substantially received within said socket.

5. In a dynamo electric machine, a stator assembly comprising a laminated pole piece, an intermediate member positioned on said pole piece perpendicular to the plane of said laminations and having a socket formed in the upper surface thereof, and a coil core extending transversely to said intermediate member and having one end substantially received within said socket.

LUDVIG P. KONGSTED.